July 18, 1961     W. A. WILLIAMS     2,992,844
SPLIT SLEEVE TYPE SHAFT CONNECTOR HAVING AN ELASTIC SLEEVE
Filed Feb. 14, 1957     2 Sheets-Sheet 1
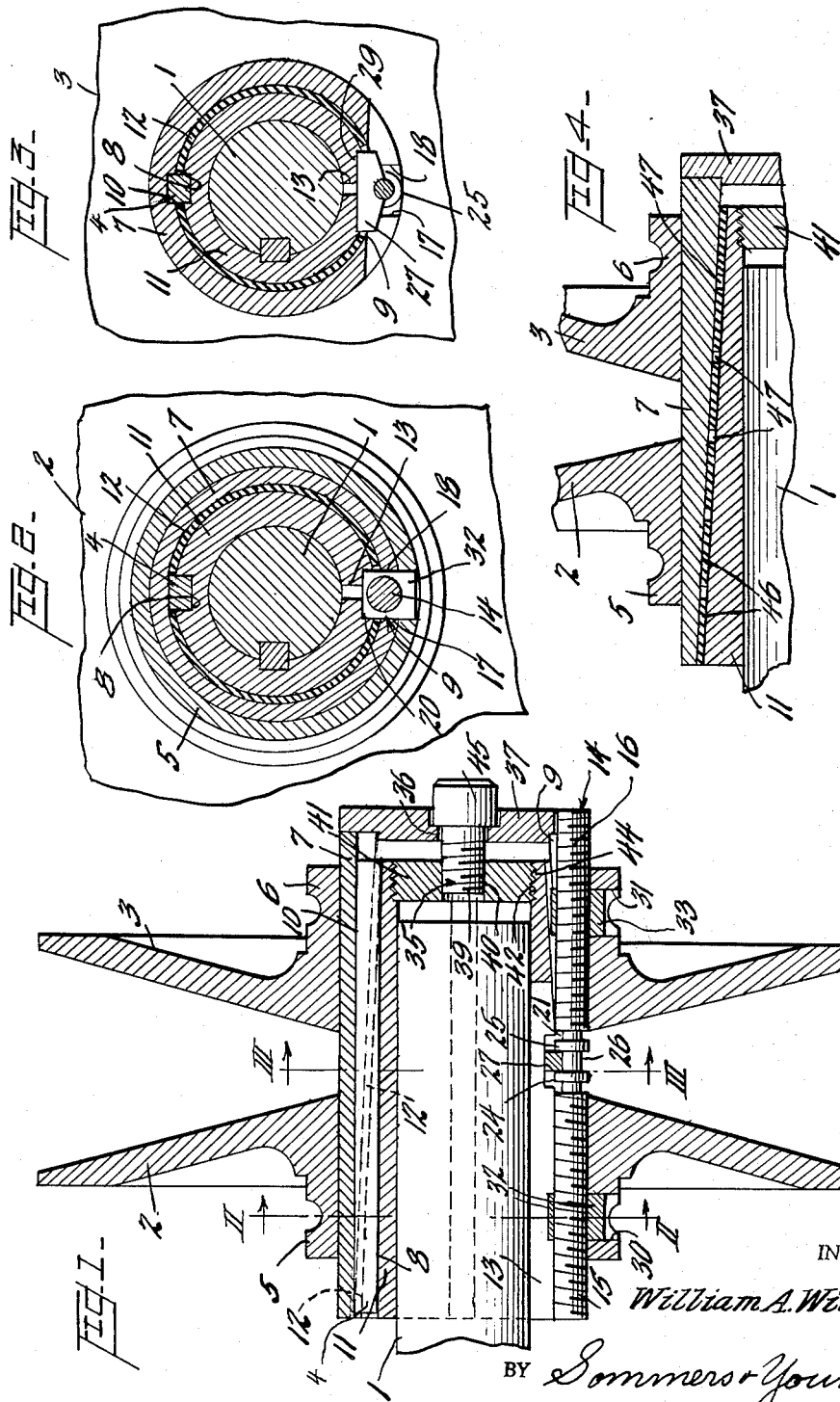
INVENTOR
*William A. Williams*
BY *Sommers & Young*
ATTORNEYS July 18, 1961 W. A. WILLIAMS 2,992,844
SPLIT SLEEVE TYPE SHAFT CONNECTOR HAVING AN ELASTIC SLEEVE
Filed Feb. 14, 1957 2 Sheets-Sheet 2
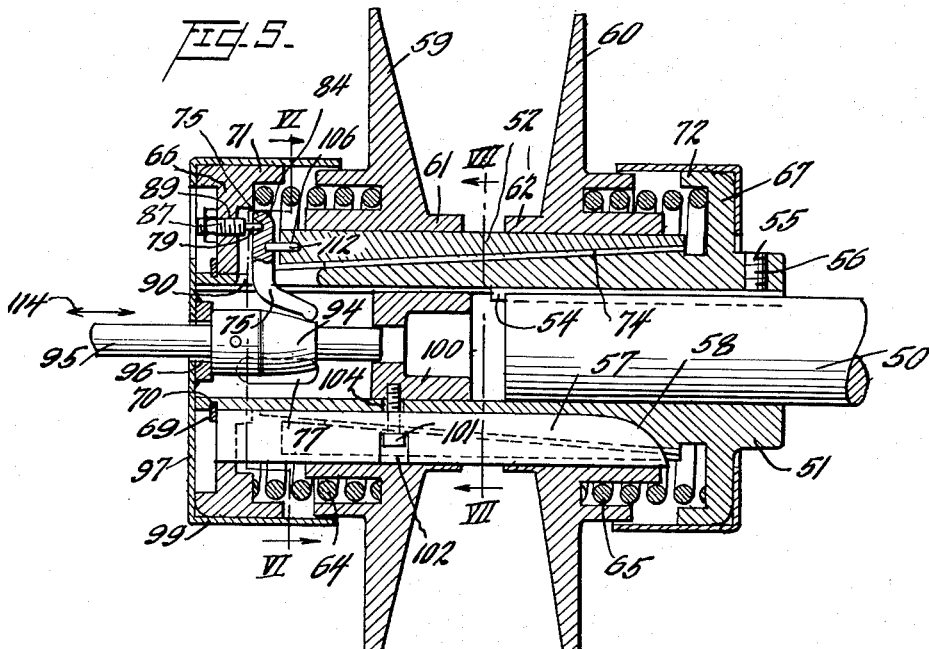
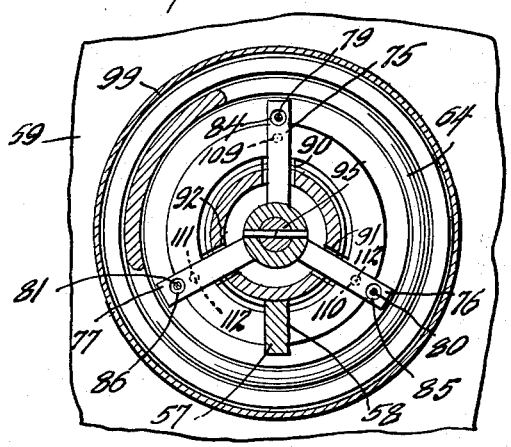
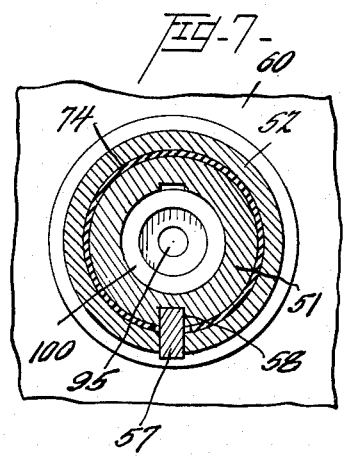
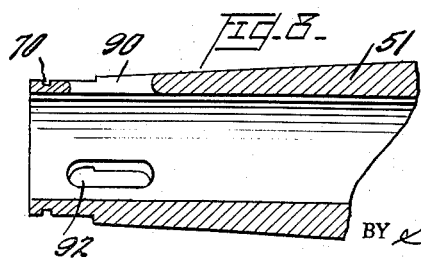
INVENTOR
William A. Williams
BY Sommers & Young
ATTORNEYS

United States Patent Office 2,992,844
Patented July 18, 1961

2,992,844
SPLIT SLEEVE TYPE SHAFT CONNECTOR HAVING AN ELASTIC SLEEVE
William A. Williams, Philadelphia, Pa., assignor to T. B. Wood's Sons Company, a corporation of Pennsylvania
Filed Feb. 14, 1957, Ser. No. 640,265
17 Claims. (Cl. 287—52.06)

This invention relates to improvements in shaft connectors for adjustable pitch sheaves and particularly for connectors of this kind employing an expandable split sleeve adapted to engage within the hubs of axially adjustable conical flanges of sheaves adapted for working with V-belts.

In previously known shaft connectors of this kind one of the principal difficulties encountered was the binding of the tapered bushing within the expandable split sleeve on which the sheave flange hubs are mounted. Thus, when it was desired to adjust the pitch of the sheave by moving the hubs axially on the sleeve it was often necessary to "break" the bushing free from the sleeve forcibly.

An object of this invention is to provide a shaft connector, particularly for sheaves, of the expanding sleeve type in which the sleeve is expanded by an axially movable bushing having a tapered outer surface, which wedges the split sleeve to a larger diameter to engage tightly within the hubs of the sheave flanges, which will be free of the former difficulty of binding of the bushing in the sleeve.

A further object of this invention is to provide a shaft connector of the above type in which a layer of rubber or similar flexible or elastic material is provided between the axially movable tapered bushing and the expansible sleeve within which it engages in operation, which prevents binding of the bushing in the sleeve, and which also compensates for minor manufacturing inaccuracies which might otherwise cause stronger binding or clamping of one flange than the other on the sleeve on which they are mounted. The provision of such layer of elastic material also provides automatic loosening of the tapered bushing from the sleeve by shear action when the axial stress between the sleeve and bushing is released.

In the accompanying drawings several embodiments are shown as exemplary of the invention.

In the drawings,

FIGURE 1 is a longitudinal sectional view of a V-type adjustable pitch sheave embodying a first embodiment of the shaft connection means according to the invention.

FIGURE 2 is a transverse sectional view on section line II—II of FIG. 1.

FIGURE 3 is a transverse sectional view on section line III—III of FIG. 1.

FIGURE 4 is an enlarged, fragmentary, longitudinal sectional view of a modified detail, the section being taken at an angle to the vertical to avoid the keys, but show the rubber between the bushing and sleeve.

FIGURE 5 is a longitudinal sectional view of a modified embodiment of the invention.

FIGURE 6 is a transverse sectional view on section line VI—VI of FIG. 5.

FIGURE 7 is a transverse sectional view on section line VII—VII of FIG. 5.

FIGURE 8 is a longitudinal sectional view of a part of an element of the embodiment according to FIGURE 5 shown separately for the sake of clarity.

In FIG. 1 of the drawings an adjustable pitch sheave is represented as being connected to the end portion of a shaft 1 which may be either a driven or driving shaft, for instance, the shaft of a driving motor, not shown. The sheave is principally comprised of a pair of frusto-conical sheave flanges 2 and 3 having hub portions 5 and 6, respectively. The inner faces of the hubs are approximately cylindrical and the hubs are mounted on a sleeve 7 which is split longitudinally as indicated at 9 and is therefore capable of expanding under the influence of outwardly directed force. The inner surface of sleeve 7 tapers longitudinally becoming of smaller diameter from left to right as viewed in FIG. 1. This sleeve is also provided with a tapering groove 10 in its inner surface at a location approximately opposite the split 9 of said sleeve, the depth of said groove 10 being greater from left to right and leaving approximately uniform thickness of the sleeve at the bottom of said groove to render the expansive flexibility of the sleeve more nearly uniform.

Sleeve 7 is mounted on bushing 11, the outer surface of which tapers in the same direction as the taper of the inner surface of sleeve 7 and at approximately the same angle, so that the sleeve would fit approximately uniformly snugly on the bushing. These parts, however, are separated by a layer 12 of elastic material such as sheet rubber the purpose of which will appear hereinafter.

Bushing 11 is also split longitudinally a substantial distance from its left hand end as viewed in FIG. 1 as indicated at 13, and is provided with a groove 8 opposite split 13, which groove is of reducing depth from left to right leaving approximate uniform thickness of the bushing at said groove to render the flexibility of the bushing more uniform throughout its length.

Sleeve 7 and bushing 11 are assembled with their respective grooves 10 and 8 adjacent each other and in said grooves is located a key 4 to prevent relative turning movement. The layer 12 of elastic material is interrupted at the location of key 4.

For the purpose of simultaneously adjusting the sheave flanges 2 and 3 relative to each other along the sleeve 7 on which they are mounted, an adjusting mechanism is provided which in many respects resembles that disclosed in U.S. Patent No. 2,753,723, dated July 10, 1956. This adjusting mechanism comprises an adjusting screw 14, the opposite end portions 15 and 16 of which are provided with screw threads of opposite hand and equal pitch. At the split 9 of sleeve 7 the edges 17 and 18 of the sleeve are spaced apart a sufficient angular distance to accommodate adjusting screw 14 which is located in the gap between edges 17 and 18 and partially in a groove 20 formed in the outer surface of bushing 11 and which extends longitudinally thereof part of the length of the bushing, and is located underneath the split 9 in sleeve 7. The center portion 21 of adjusting screw 14 is free of threads and may be of reduced diameter, and is provided with a pair of longitudinally spaced flanges 24 and 25, respectively, which extends a locking key 27 which is mounted in a transversely extending slot 29 formed in bushing 11.

The hubs 5 and 6 of sheave flanges 2 and 3 are each formed with a radially extending smooth cylindrical bore 30, 31, respectively, in each of which is rotatably mounted a cylindrical plug or nut 32, 33, respectively. Each of these nuts is provided with a bore extending transversely thereof, that is, longitudinally of the axis of the sheave when properly adjusted, and is provided with internal screw threads which engage with the screw threads on the opposite end portions 15, 16, respectively of adjusting screw 14. When the hubs of sheave flanges 5 and 6, are loose on sleeve 7 the longitudinal positions of said sheave flanges can be adjusted by turning screw 14 in a suitable manner, for instance, as indicated in U.S. Patent No. 2,753,723, July 10, 1956.

For the purpose of securely clamping sheave flanges 2, 3 on shaft 1 and in order to relieve adjusting screw 14 from the driving load in operation, means is provided for moving sleeve 7 and bushing 11 longitudinally relative to each other so as to draw their tapering surfaces together, and, by the resulting wedging action, squeeze bushing 11 upon shaft 1 and expand sleeve 7 against the inner faces of hubs 5 and 6 of sheave flanges 2 and 3. This relative longitudinal movement can be effected by means of a screw 35 the shank of which freely extends through a central opening 36 in cap plate 37 which rests at its edges against the free end of sleeve 7 which extends longitudinally beyond bushing 7. The shank 39 of screw 35 screw-threadedly engages in a threaded bore 40 in plug 41 which is mounted inside the freely extending end portion of bushing 11 beyond the end of shaft 1. The outer edge of plug 41 is provided with screw threads 42 which engage interior threads 44 in the inside of the free end of bushing 11 beyond the end of shaft 1. The head 45 of screw 35 abuts against plate 37 when the screw is turned into bore 40 and the sleeve 7 and bushing 11 are drawn axially in opposite directions causing sleeve 7 to expand by flexing and bind against hubs 5 and 6 while bushing 11 is compressed by flexing into strong, binding engagement with shaft 1. During this action the elastic layer 12 is subjected to strong compressive force and also to elastic deformation in shear in the axial direction of the sheave.

When it is desired to release the sheave flanges for relative adjustment to change the pitch of the sheave, screw 35 is turned outwardly from bore 40 so that the axial forces on sleeve 7 and bushing 11 are reduced and released, whereby under the resilience of the elastic layer 12 the sleeve and bushing are moved axially in the releasing direction automatically, and the difficulties of separating the sleeve and bushing heretofore encountered are avoided.

Instead of using a complete sheet or layer of elastic material between the bushing 11 and sleeve 7, an embodiment is represented in FIG. 4 in which strips 46 of elastic material is used being applied on the bushing with small spaces 47 between the strips. This provides for greater radial compression to further ensure a uniform grip on the two flange hubs by sleeve 7. The strips 46 are, of course, interrupted at the location corresponding to the interconnecting key corresponding to key 4 of FIGS. 1, 2 and 3.

In practice the rubber layer 12 and strips 46 are preferably bonded to the bushing and then the outer surface of the rubber is ground true.

The embodiment of the invention represented in FIGS. 5–8 inclusive is of the type generally referred to as a lock up motion control sheave. In this embodiment numeral 50 designates a driving or driven shaft, for instance, the shaft of a driving motor. On this shaft is fixedly mounted a bushing 51 which is secured on shaft 50 by a set of keyways formed in said bushing and shaft and key 54 which is securely locked by set screw 55 in radial screw bore 56 in bushing 51, and engaging with its inner end against key 54. Bushing 51 extends considerably beyond the end of shaft 50 and at least the central portion of its outer surface is tapering, becoming smaller to the left as viewed in FIG. 5. On the outer tapering portion of bushing 51 is mounted a split sleeve 52. The split in sleeve 52 extends the entire length thereof and the edges of the split are spaced apart a sufficient distance for the insertion of a key member 57 which extends into a longitudinally extending groove 58 in bushing 51 in register with the split in sleeve 52.

On the outside of sleeve 52 are mounted a pair of conical sheave flanges 59, 60, the hubs 61, 62 are adapted to slide on sleeve 52 when said sleeve is in normal condition of contraction, and said hubs are pressed toward each other by a pair of helical springs 64, 65 which are mounted, respectively, on the outer sides of said hubs and have their other ends engaging against abutment plates 66, 67 respectively. Abutment plate 66 is provided with a central opening for accommodating the smaller end portion of bushing 51, and is locked in place on said bushing by a snap ring 69 which engages in annular groove 70 in bushing 51 near its small end. Abutment flange or plate 67 is represented as being formed integrally with the outer edge portions; plates 66, 67 are provided with inturned edges 71, 72 within which springs 64 and 65, respectively, are lodged and retained.

Between the outer tapered surface of bushing 51 and the inner tapered surface of split sleeve 52 is disposed a layer of elastic material 74, such as rubber, which may be in the form of a sheet, or spaced strips, as represented in FIG. 4. In practice the rubber may be bonded by an adhesive or vulcanization to the bushing and may be ground true before being assembled in the sheave.

For locking the hubs 61, 62 of the sheave flanges on split sleeve 52, and the sleeve on the bushing 51, means is provided for pressing sleeve 52 axially of the sheave to the right as viewed in FIG. 5 so that the split tapered sleeve 52 wedges against tapered bushing 51 and expands into tight, driving engagement with sheave flange hubs 61 and 62. By this relative movement the layer of elastic material 74 is put under strong compression and also shear in the axial direction, so that upon relaxation of the force pressing sleeve 52 to the right the elasticity of the layer 74 presses sleeve 52 to the left and tends to disengage its binding connection with hubs 61, 62.

In this embodiment of the invention the means for pressing sleeve 52 to the right to effect the driving connection comprises a set of radially disposed simple levers arranged at the left hand end of sleeve 52. These levers are represented as being three in number and bear numeral 75, 76, and 77. The outer portions of these radial levers are fulcrumed on pins 79, 80, and 81 respectively, which extend into rounded depressions 84, 85, and 86, respectively, in said outer end portions of the said levers. The pins 79, 80, and 81 are extensions of screws 87, which engage in screw threaded bores in end plate 66, one of which is shown in FIG. 5 and is designated 89. The inner portions of levers 75, 76, and 77 extend inwardly through a set of angularly spaced, elongated openings 90, 91, 92, respectively in the small end of bushing 51, and their inner ends are engaged by a cone-shaped cam 94, mounted on an axially extending rod 95 which extends into the interior of bushing 51 through a central opening 96 in cup-shaped end cover 97, the side wall 99 of which extends over the outer periphery of end plate 66, and covers the space outwardly of spring 64 between plate 66 and sheave flange 59. The inner end of rod 95 is slidably supported in a bearing 100, which is fixed in position by screw 101, which has its head seated in a recess 102 in key 57, and its shank extending through opening 104 in bushing 51 and screw threadedly engaged in threaded opening 105 in bearing 100.

The left hand end of sleeve 52, as viewed in FIG. 5, is provided with a set of three angularly spaced recesses 106, each adjacent one of the levers 75, 76, and 77, and the said levers are each provided with a recess 109, 110, 111, FIG. 6, facing and opposite its adjacent recess 106. Seated in the recesses 106 of sleeve 52 and in recesses 109, 110, 111, respectively, are pins 112 which serve as push rods for pressing sleeve 52 longitudinally to the right to create the wedging action by means of which sleeve 52 firmly and securely engages elastic sheet 74, compressing it strongly on bushing 51. By this action firm driving connection is established between bushing 51 and sleeve 52 and at the same time elastic sheet 74 is subjected to elastic deformation in sheave which, in a similar manner as described in connection with FIGS. 1–4 serves to allow ready release of the connection between the bushing and sleeve and separation of said parts without difficulty when the axial force is discontinued.

The said wedging action of split sleeve 52 on conical bushing 51, and resulting expansion of said sleeve causes the sleeve to firmly, drivingly engage and bind within sheave hubs 61 and 62.

Actuation of cam 94 for exerting pressure on levers 75, 76, 77, which is transmitted to sleeve 52 through pins 106, may be accomplished by any suitable means which, per se, is not part of this invention and is therefore, represented diagrammatically by arrows 114, FIG. 5. Such an actuating means could comprise a slotted lever pivoted to a member connected with a relative fixed element such as the motor base, and a thrust bearing between the lever and shaft 95.

I claim:

1. In shaft connectors, an element having a hub, a shaft having a free end portion on which said hub is to be connected, a bushing mounted on said free end portion of said shaft, said bushing having a conical outer surface, a sleeve having a correspondingly conical inner surface mounted co-axially on said bushing, said sleeve having a longitudinal split, said hub being mounted on said sleeve coaxially, a non-metallic layer of elastic material between said bushing and sleeve, and means operably connected with said sleeve and bushing for exerting axial force between said sleeve and bushing.

2. A shaft connector according to claim 1, and in which said bushing is provided with a longitudinally extending gap extending from one end thereof to allow compression against said shaft upon relative movement between said bushing and sleeve.

3. A shaft connector according to claim 1, and in which the means for exerting axial force is a screw, connected to said bushing and sleeve.

4. A shaft connector according to claim 2, and in which the gap in said bushing extends less than the entire length of said bushing.

5. A shaft connector according to claim 2, and in which said bushing has an end portion, opposite the end from which said gap extends, having interior screw threads and having an exteriorly threaded plug engaged therein, said plug having a centrally located bore having screw threads, said sleeve extending longitudinally beyond the screw threaded end of said bushing, a cap engaging said sleeve longitudinally beyond said screw-threaded end of said bushing and extending across said sleeve, said cap having a central opening opposite said screw-threaded bore of said plug, and said means for exerting axial force comprising a screw extending through said cap opening and engaging the bore threads of said plug.

6. A shaft connector according to claim 1, in which said means for exerting axial force between said sleeve and bushing comprises a set of levers having their fulcrums pivotally mounted with respect to said bushing and each having one arm operatively engaging against said sleeve, and means mounted for movement in position to press against the other arm of each of said levers to exert said axial force.

7. A shaft connector according to claim 6, in which pins are provided extending between said levers and said sleeve, and said levers are provided with recesses for end portions of said pins.

8. A shaft connector according to claim 7, in which said bushing has a flange at one end extending outwardly therefrom, and pins mounted in said flange and engaging said levers to provide the fulcrums of said levers.

9. A shaft connector according to claim 8, in which said bushing is provided with a set of radial openings through which levers extend into its interior.

10. A shaft connector according to claim 9, in which said means for pressing against said levers to exert the axial force comprises a cone-shaped cam mounted on a rod extending axially into the interior of said bushing.

11. A shaft connector according to claim 10, in which said bushing is provided with a guide plug fixedly mounted in its interior and provided with an axially extending guide opening for the inner end portion of said rod.

12. A shaft connector according to claim 1, in which said elastic layer is attached to said bushing.

13. A shaft connector according to claim 1, in which said elastic layer is bonded to said bushing.

14. A shaft connector according to claim 1, in which the outer surface of said elastic layer is of true circular shape in transverse cross section.

15. A shaft connector according to claim 1, in which said elastic layer has open gaps between portions of itself which are free of elastic material.

16. A shaft connector according to claim 1, and in which said element provided with the hub is a sheave flange.

17. In shaft connectors for a rotary power transmitting element, a hub of said element, a shaft on which said element is to be secured, a conical bushing coaxially mounted on said shaft, an internally conical sleeve co-axially mounted on said bushing, said sleeve having a longitudinal split enabling it to expand under internal pressure, a layer of elastic material between said bushing and sleeve, said hub being co-axially mounted on said sleeve, and means operatively mounted on said bushing and operably engageable with said sleeve for pressing said sleeve axially of said bushing to produce a wedging action between said sleeve and hub to cause said sleeve to expand and lock said hub on its outer surface, and to compress said elastic layer and drivingly connect itself to said bushing, and to exert a longitudinal shear stress in said elastic layer which serves to release the sleeve from the hub upon discontinuance of the axial pressure.

References Cited in the file of this patent

UNITED STATES PATENTS

| | | |
|---|---|---|
| 189,483 | McNair | Apr. 10, 1877 |
| 1,216,244 | McDowell | Feb. 13, 1917 |
| 1,867,364 | Lee | July 12, 1932 |
| 1,958,621 | Heppenstall | May 15, 1934 |
| 2,390,168 | Piot | Dec. 4, 1945 |
| 2,545,327 | Williams | Mar. 13, 1951 |
| 2,594,555 | Hardy | Apr. 29, 1952 |
| 2,654,413 | Weidel | Oct. 6, 1953 |
| 2,718,155 | Firth | Sept. 20, 1955 |